J. M. HARNED.
TOBACCO CULTIVATOR.
APPLICATION FILED FEB. 3, 1913.
1,074,619.
Patented Oct. 7, 1913.
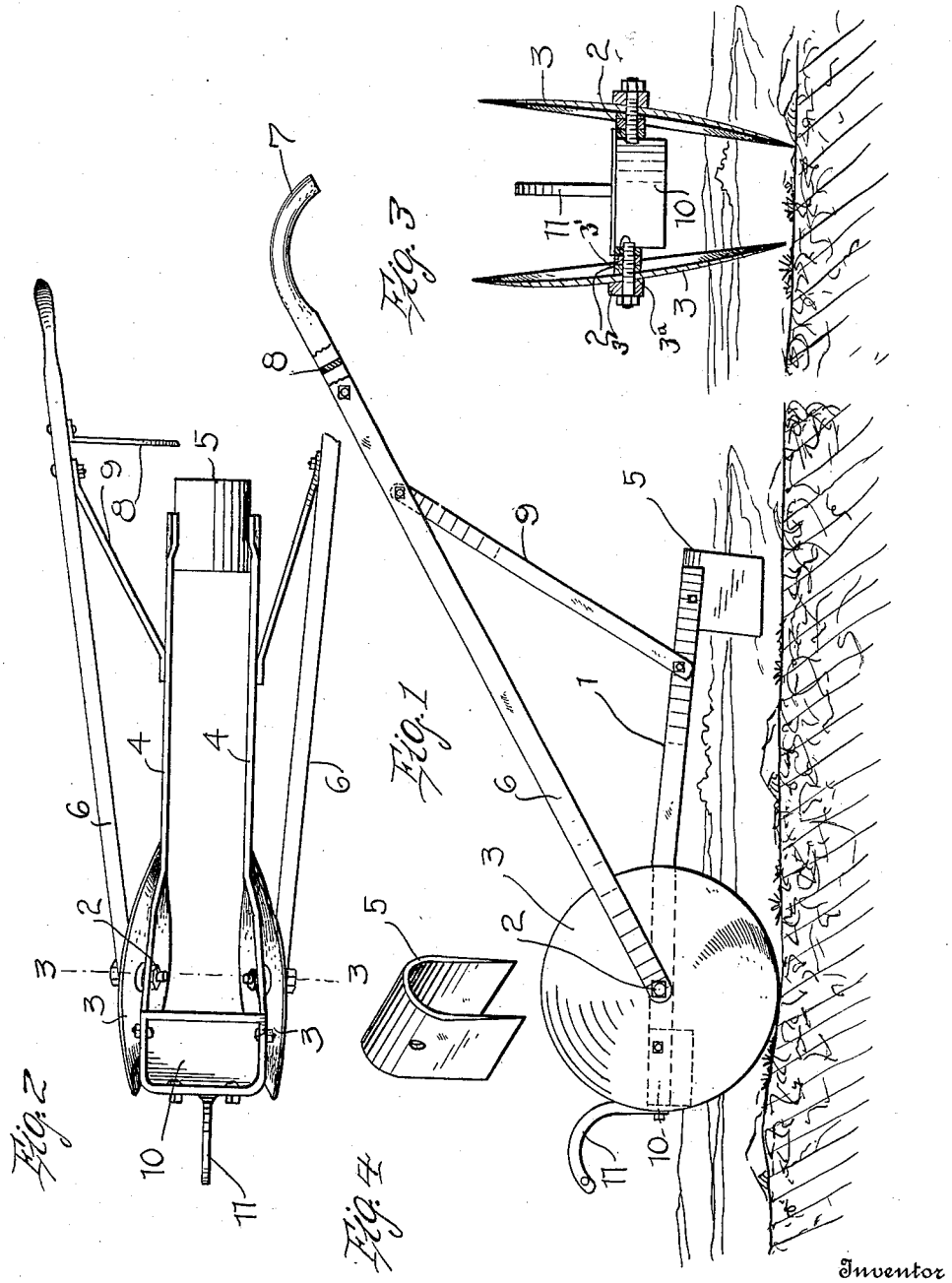
Witnesses
Robert M. Lutphend.
N. I. Hind.
Inventor
J. M. Harned
By Watson E. Coleman
Attorney

UNITED STATES PATENT OFFICE.

JOHN MORGAN HARNED, OF MADISONVILLE, KENTUCKY.

TOBACCO-CULTIVATOR.

1,074,619.　　　　　Specification of Letters Patent.　　　Patented Oct. 7, 1913.

Application filed February 3, 1913. Serial No. 746,075.

*To all whom it may concern:*

Be it known that I, JOHN MORGAN HARNED, a citizen of the United States, residing at Madisonville, in the county of Hopkins and State of Kentucky, have invented certain new and useful Improvements in Tobacco-Cultivators, of which the following is a specification, reference being had to the accompanying drawings.

This invention relates to new and useful improvements in cultivators and more particularly to a cultivator for use in growing tobacco and my object is to provide a device of this character which will quickly and readily form hills.

A further object of the invention resides in providing a device which is provided with a drag for smoothing the ridge or hill formed, at the same time removing all extraneous matter and packing the same tightly.

Still another object of the invention resides in providing a device which is extremely simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claim.

In the accompanying drawings forming a part of this application, Figure 1 is a side elevation of the device. Fig. 2 is a plan view thereof. Fig. 3 is a transverse section through the same as seen on line 3—3, of Fig. 2. Fig. 4 is a perspective view of the same.

In describing my invention, I shall refer to the drawing in which similar reference characters designate corresponding parts throughout the several views and in which—

1 indicates a frame preferably formed of a single strip of metal bent upon itself to provide a base and spaced apart arms having those portions thereof immediately adjacent the base disposed parallel to one another and the portions immediately continuing therefrom converging rearwardly and the portions of said arms continuing from said rearwardly converging portions being disposed parallel one to another. Mounted on the rearwardly converging portions of these arms are spindles or stub axles 2, upon which are rotatably mounted the disks 3 and disposed on said stub axles or shafts 2, on opposite sides of the disks 3, are the nuts or substantial washers 3'. The inner opposed faces of these nuts are beveled, as shown at 3ª, in such a manner that when properly disposed in contact with the opposite faces of said disks, will in turn, dispose the latter in an inclined position inwardly and downwardly. These washers or nuts 3' space the disks 3 slightly from the arms of the frame, so that the latter form substantial cleaners or the like for said disks, as the same are rotated in the course of use and the rearward parallel portions of the arms which are indicated at 4, have secured to their free ends, an inverted U-shaped or channel-shaped drag member 5. This member is adapted to smooth over the soil between the ridges formed by the disks. Mounted on the free ends of the stub axles or spindles 2 are the lower ends of upwardly and rearwardly inclined arms 6, the free ends of which are bent to form handles 7. These arms 6 are braced by means of the bracing bar 8 which connects said arms and additional bracing arms 9 are provided which are connected to the arms 6 and the parallel portions 4 of the arms of said frame 1.

As stated, the frame 1 is formed of a strip of metal bent upon itself and the intermediate portion of the strip which forms the forward portion of the frame has a receptacle or the like 10 carried thereon, between the arms of the frame. This receptacle is adapted to contain a weight to aid in forcing the disks into the soil. Also secured to the intermediate portion of this strip of metal forming the forward portion of the frame is an upwardly extending and outwardly bent arm 11. This arm may be connected with any other form of cultivating device, but is preferably used for the purpose of attaching draft animals to the device.

From the foregoing description of the construction of my improved device, the operation thereof will be readily understood and it will be seen that I have provided a device which is simple and durable in construction, inexpensive to manufacture and one which will be very efficient and useful in operation.

While I have particularly described the elements best adapted to perform the functions set forth, it is obvious that various changes in form, proportion and in the minor details of construction may be resorted to without departing from the spirit or sacrificing any of the principles of the invention.

Having thus described this invention, what I claim is:—

In a cultivator of the class described, a frame formed of a single strip of metal bent to provide a base, a pair of spaced arms, said arms having portions intermediate the ends thereof converging rearwardly and the remaining portions of said arms on both sides of the rearwardly converging portions being disposed parallel, stub axles projecting laterally from the converging portions of said arms, disks rotatably mounted on said axles, and means in connection with said axles and disks to incline the latter downwardly and inwardly, said disks being spaced but slightly from the converging portions of said arms, whereby the latter may form cleaners for said disks.

In testimony whereof I hereunto affix my signature in the presence of two witnesses.

JOHN MORGAN HARNED.

Witnesses:
JOHN F. READING,
N. I. TOOMBS.

Copies of this patent may be obtained for five cents each, by addressing the "Commissioner of Patents, Washington, D. C."